(12) United States Patent
Murase

(10) Patent No.: US 9,020,737 B2
(45) Date of Patent: Apr. 28, 2015

(54) CONTROL APPARATUS FOR INTERNAL COMBUSTION ENGINE INCLUDING ENGINE STOP CONTROL

(75) Inventor: Eiji Murase, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 616 days.

(21) Appl. No.: 13/382,080

(22) PCT Filed: Jun. 22, 2010

(86) PCT No.: PCT/IB2010/001504
§ 371 (c)(1),
(2), (4) Date: Jan. 3, 2012

(87) PCT Pub. No.: WO2011/001241
PCT Pub. Date: Jan. 6, 2011

(65) Prior Publication Data
US 2012/0109498 A1    May 3, 2012

(30) Foreign Application Priority Data
Jul. 3, 2009    (JP) .................................. 2009-158969

(51) Int. Cl.
  *F02D 41/04*    (2006.01)
  *F02D 41/00*    (2006.01)
  *F02N 11/08*    (2006.01)
(52) U.S. Cl.
  CPC .......... *F02D 41/047* (2013.01); *F02D 41/0025* (2013.01); *F02D 41/042* (2013.01); *F02D 2250/11* (2013.01); *F02N 11/0829* (2013.01); *F02N 2200/023* (2013.01); *Y02T 10/48* (2013.01)

(58) Field of Classification Search
  CPC .. B60W 30/182; Y02T 10/48; F02N 11/0818; F02N 11/0829; F02N 11/0837; F02N 2200/023; F02D 2250/11; F02D 41/042; F02D 41/047
  USPC .......... 701/22, 103, 104, 112, 113; 123/96 A, 123/196 AB, 196 R, 41.05, 572–574, 674, 123/698, 73 AD
  See application file for complete search history.

(56) References Cited

U.S. PATENT DOCUMENTS 5,806,486 A  *  9/1998  Gee et al. .................. 123/339.22
(Continued)

FOREIGN PATENT DOCUMENTS

DE    10 2008 003 076        7/2008
(Continued)

OTHER PUBLICATIONS

140709 Takashi JP 2007 231838 English machine translation.pdf.*
(Continued)

*Primary Examiner* — Erick Solis
*Assistant Examiner* — Carl Staubach
(74) *Attorney, Agent, or Firm* — Oblon, McClelland, Maier & Neustadt, L.L.P.

(57) ABSTRACT

A control apparatus for an internal combustion engine includes a fuel injection portion that carries out fuel injection for the internal combustion engine, a recirculation portion that recirculates to an intake system evaporative gas of injected fuel that has been mixed with lubricating oil for the internal combustion engine, a parameter acquisition portion that acquires a fuel mixture parameter corresponding to an amount of fuel that has been mixed with the lubricating oil, an engine stop portion that performs engine stop control to temporarily stop the internal combustion engine when a predetermined stop condition is fulfilled, and a stop condition correction portion that corrects a stop condition of the engine stop control on the basis of at least the fuel mixture parameter.

12 Claims, 7 Drawing Sheets

(56) References Cited

U.S. PATENT DOCUMENTS

| | | | |
|---|---|---|---|
| 6,415,602 B1 * | 7/2002 | Patchett et al. | 60/286 |
| 7,269,496 B2 * | 9/2007 | Honda et al. | 701/104 |
| 7,996,141 B2 * | 8/2011 | Pache et al. | 701/103 |
| 8,090,520 B2 * | 1/2012 | Tate et al. | 701/104 |
| 8,113,186 B2 * | 2/2012 | Tsunooka et al. | 123/698 |
| 2003/0163243 A1 | 8/2003 | Inoue | |
| 2004/0099252 A1 * | 5/2004 | Nagaishi et al. | 123/480 |
| 2007/0298928 A1 | 12/2007 | Yamanaka et al. | |
| 2010/0094526 A1 | 4/2010 | Ando et al. | |
| 2010/0138086 A1 | 6/2010 | Imamura et al. | |

FOREIGN PATENT DOCUMENTS

| | | |
|---|---|---|
| JP | 10-77821 A | 3/1998 |
| JP | 10 317936 | 12/1998 |
| JP | 2002-529043 | 9/2002 |
| JP | 2003-322047 A | 11/2003 |
| JP | 2004 138468 | 5/2004 |
| JP | 2004 293394 | 10/2004 |
| JP | 2005-207297 A | 8/2005 |
| JP | 2006-57530 A | 3/2006 |
| JP | 2006-138283 A | 6/2006 |
| JP | 2006-321466 | 11/2006 |
| JP | 2007 032324 | 2/2007 |
| JP | 2007 231838 | 9/2007 |
| JP | 2008-128074 A | 6/2008 |
| JP | 4172210 | 10/2008 |
| JP | 2008-267227 A | 11/2008 |
| JP | 2008 297984 | 12/2008 |
| JP | 2008 298001 | 12/2008 |
| JP | 4192677 | 12/2008 |
| WO | WO 00/25417 | 5/2000 |
| WO | 2009 024864 | 2/2009 |

OTHER PUBLICATIONS

International Search Report Issued Dec. 9, 2010 in PCT/IB10/001504 Filed Jun. 22, 2010.

* cited by examiner

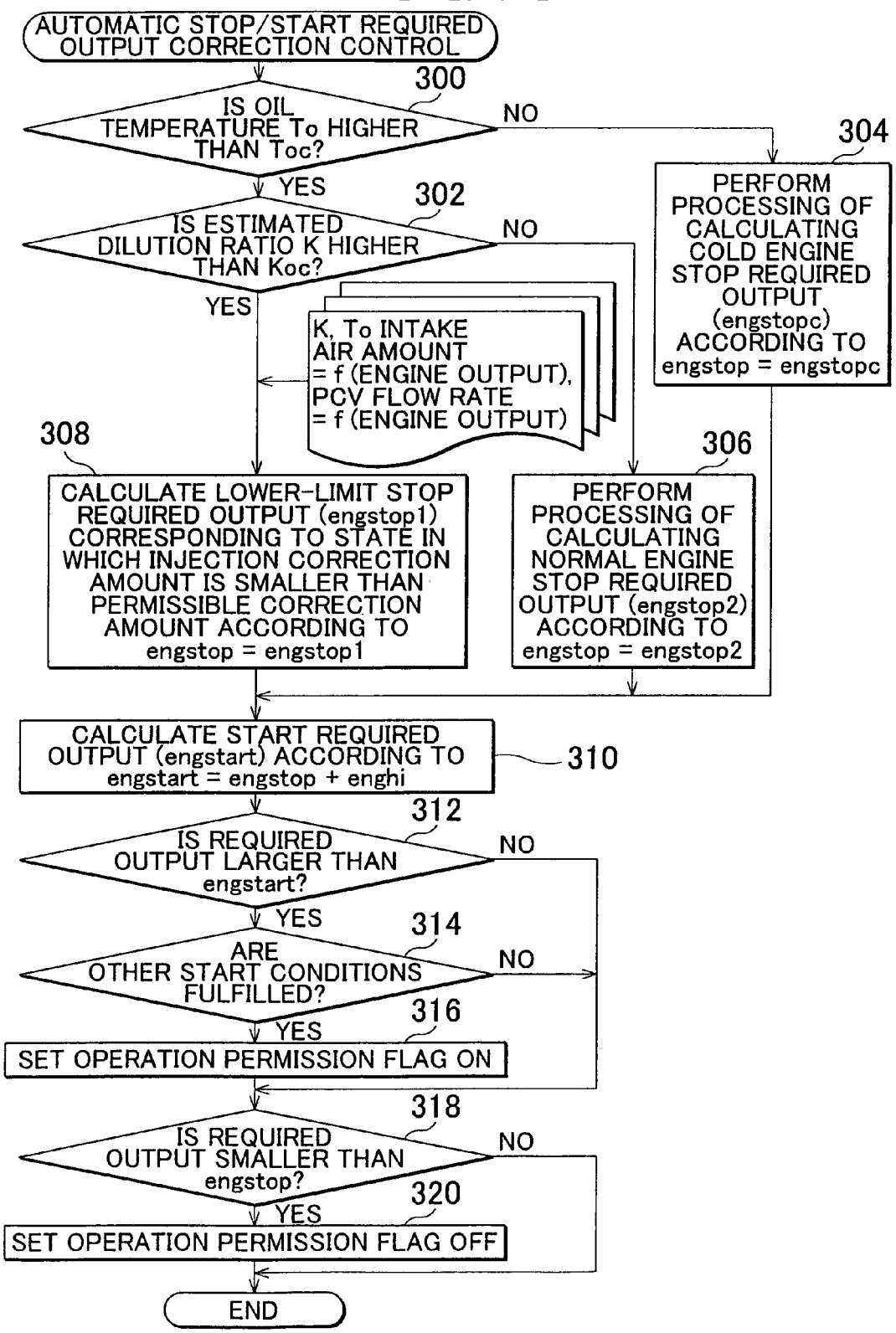

CONTROL APPARATUS FOR INTERNAL COMBUSTION ENGINE INCLUDING ENGINE STOP CONTROL

BACKGROUND OF THE INVENTION

1. Field of the Invention

The invention relates to a control apparatus for an internal combustion engine. In particular, the invention relates to a control apparatus for an internal combustion engine that performs engine stop control.

2. Description of the Related Art

As a related art, as disclosed in, for example, Japanese Patent Application Publication No. 10-317936 (JP-A-10-317936), there is known a control apparatus for an internal combustion engine that is configured to hold a ratio of injected fuel that has been mixed with lubricating oil (an oil dilution ratio) low. In the related art, when the necessity to reduce the oil dilution ratio arises, the temperature of coolant for the internal combustion engine is raised to raise the temperature of lubricating oil, thereby promoting the evaporation of the fuel that has been mixed with lubricating oil.

Further, as another related art, there is known a control apparatus for an internal combustion engine that performs so-called engine stop control. In engine stop control, when the output of the internal combustion engine is not required, the operation of the engine is temporarily stopped. As examples of engine stop control, idle stop control for stopping the internal combustion engine when a vehicle is stopped at a traffic light or the like, control for stopping the internal combustion engine when a hybrid vehicle runs by an electric motor, and the like are known.

Meanwhile, the aforementioned related arts adopt a configuration in which the oil dilution ratio is held low by controlling the temperature of lubricating oil on the basis of the temperature of coolant for the internal combustion engine. However, the following problem is caused when these related arts are applied to a vehicle in which engine stop control is performed.

When engine stop control is performed during the operation of the internal combustion engine, the combustion in the internal combustion engine as a heat generation source in a cylinder is stopped. Thus, the temperatures of a cylinder bore and lubricating oil tend to fall more rapidly than in the case where the combustion of the internal combustion engine continues. Then, when the temperature of oil suddenly changes, the relationship between the temperature of oil and the temperature of coolant also changes greatly. Therefore, it is difficult to estimate or control the oil temperature on the basis of the coolant temperature. As a result, the control of the oil dilution ratio is also likely to undergo an error.

SUMMARY OF THE INVENTION

The invention provides a control apparatus for an internal combustion engine that can stably control a state of the mixture of injected fuel with lubricating oil and confine the state of the mixture of fuel to a permissible range even when engine stop control is performed.

A control apparatus for an internal combustion engine according to a first aspect of the invention includes a fuel injection portion that carries out fuel injection for the internal combustion engine, a recirculation portion that recirculates to an intake system evaporative gas of injected fuel that has been mixed with lubricating oil for the internal combustion engine, a parameter acquisition portion that acquires a fuel mixture parameter corresponding to an amount of fuel that has been mixed with the lubricating oil, an engine stop portion that performs engine stop control to temporarily stop the internal combustion engine when a predetermined stop condition is fulfilled, and a stop condition correction portion that corrects a stop condition of the engine stop control on a basis of at least the fuel mixture parameter.

According to the aforementioned configuration, the stop condition correction portion can correct the stop condition of engine stop control on the basis of at least the fuel mixture parameter. The control range in which engine stop control is performed can be enlarged or narrowed in accordance with this correction. Thus, the amount of the fuel mixed with lubricating oil can be controlled to a desired level by appropriately adjusting the frequency of performance of engine stop control and the duration time of engine stop control. Accordingly, in a system that performs engine stop control as well, the amount of the fuel mixed with lubricating oil can be confined to a permissible range. Then, even while recirculating evaporative gas of fuel to the intake system, the state of combustion can be stabilized by suppressing changes in combustion such as a deviation in an air-fuel ratio A/F and the like.

In the aforementioned configuration, the control apparatus may be equipped with an engine temperature acquisition portion that acquires a coolant temperature of the internal combustion engine or an oil temperature of the lubricating oil as an engine temperature. The engine stop portion may perform the engine stop control when it is determined that the engine temperature is equal to or higher than a stop permission temperature, using the engine temperature as the stop condition. The stop condition correction portion may raise the stop permission temperature more than usual when the fuel mixture parameter becomes larger than a predetermined reference value.

According to the aforementioned configuration, the stop condition correction portion can raise the stop permission temperature more than usual when the fuel mixture parameter becomes larger than the reference value. When the stop permission temperature is raised, the temperature range in which the operation of the internal combustion engine is permitted is correspondingly widened to increase the duration time and frequency of the operation. Therefore, the engine temperature can be held relatively high. Thus, the frequency of the operation at low temperatures at which injected fuel is likely to be mixed with lubricating oil can be reduced. As a result, the amount of the mixture of fuel can be restrained from increasing due to low-temperature operation.

In the aforementioned configuration, the stop condition correction portion may reduce a width of a rise in the stop permission temperature as the fuel mixture parameter increases while remaining larger than the reference value.

According to the aforementioned configuration, the stop condition correction portion can reduce the width of the rise in the stop permission temperature as the fuel mixture parameter increases while remaining larger than the reference value. That is, when the fuel mixture parameter is small, the generation amount of evaporative gas of fuel is not very large even though the engine temperature is raised. Therefore, the fuel in lubricating oil can be swiftly evaporated by positively operating the internal combustion engine through a substantial rise in the stop permission temperature. On the other hand, when the fuel mixture parameter is large, the width of the rise in the stop permission temperature is held small to prevent evaporative gas of fuel from being rapidly generated. Thus, the fuel in lubricating oil can be evaporated at such an appropriate pace as not to cause a deviation in the air-fuel ratio A/F by relatively slowly raising the engine temperature.

In the aforementioned configuration, the stop condition correction portion may increase a width of a rise in the stop permission temperature as the engine temperature rises while the fuel mixture parameter remains larger than the reference value.

According to the aforementioned configuration, the stop condition correction portion can increase the width of the rise in the stop permission temperature as the engine temperature rises while the fuel mixture parameter remains larger than the reference value. That is, the generation amount of evaporative gas of fuel increases as the width of the rise in temperature increases. Accordingly, when the engine temperature is low, the width of the rise in the stop permission temperature is set small to hold the speed of the rise in the engine temperature low. The evaporative gas of fuel can thereby be prevented from being rapidly generated. On the other hand, when the oil temperature is high, the width of the rise in temperature is small until the engine temperature reaches a certain temperature after warm-up. Therefore, there is no need to consider an abrupt increase in the amount of evaporative gas. Thus, the fuel in lubricating oil can be swiftly evaporated by substantially raising the stop permission temperature.

In the aforementioned configuration, the control apparatus may be equipped with an idle operation limitation portion that limits idle operation of the internal combustion engine regardless of a state of fulfillment of the stop condition when the fuel mixture parameter becomes larger than a predetermined upper limit larger than the reference value.

According to the aforementioned configuration, when the fuel mixture parameter becomes larger than the upper limit larger than the reference value, a case where, for example, the effect of the stop condition correction portion cannot be sufficiently exerted is also assumable. In this case, the idle operation limitation means can limit idle operation of the internal combustion engine as an emergency measure regardless of the state of fulfillment of the stop condition. Accordingly, the exhaust gas emission properties can be prevented from deteriorating in an idle operation range in which a deviation in the air-fuel ratio A/F is relatively likely to occur due to a small amount of intake air.

In the aforementioned configuration, the control apparatus may be equipped with an auxiliary motive power portion that generates a motive power at least when the internal combustion engine is stopped. The auxiliary motive power portion may generate a driving force of the vehicle when the engine stop portion stops the internal combustion engine.

According to the aforementioned configuration, in a hybrid vehicle or the like, even when the internal combustion engine is stopped, the auxiliary motive power portion can generate a driving force of the vehicle. Accordingly, the operation control of the internal combustion engine is unlikely to be limited by the operation state of the vehicle or the like. Therefore, engine stop control and correction control for the stop condition can be smoothly performed.

In the aforementioned configuration, the stop condition in the engine stop portion may be a condition that the internal combustion engine be held stopped when a required driving force of the vehicle becomes smaller than an engine stop required reference value at which the internal combustion engine is to be stopped. The stop condition correction portion may increase the engine stop required reference value to correct the stop condition.

According to the aforementioned configuration, the engine stop portion can make a changeover in motive power to the auxiliary motive power portion by stopping the internal combustion engine when the required driving force of the vehicle becomes smaller than the engine stop required reference value. Further, the stop condition correction portion can appropriately correct the engine stop required reference value on the basis of at least the fuel mixture parameter such that the internal combustion engine operates only in, for example, an operation range in which the amount of the deviation in the air-fuel ratio A/F is confined to a permissible range. According to this correction, even when the operation range suited for the operation of the internal combustion engine changes in accordance with the state of the mixture of fuel with lubricating oil, the engine stop required reference value can be appropriately changed in response to this change. Accordingly, in a low-load operation range in which a deviation in the air-fuel ratio A/F is likely to occur, the auxiliary motive power portion can be operated. As a result, the deviation in the air-fuel ratio A/F can be restrained from occurring in a hybrid vehicle or the like as well.

In the aforementioned configuration, the stop condition correction portion may increase the engine stop required reference value as the fuel mixture parameter increases.

According to the aforementioned configuration, even when the amount of evaporative gas of the fuel recirculated to the intake system is constant, the recirculation amount of evaporative fuel increases as the fuel mixture parameter increases. As a result, a deviation in the air-fuel ratio A/F is likely to occur correspondingly in a high load-side operation range as well. On the other hand, the stop condition correction portion can widen toward the high load side the operation range in which the auxiliary motive power portion is operated by increasing the engine stop required reference value as the fuel mixture parameter increases.

In the aforementioned configuration, the stop condition correction portion may increase the engine stop required reference value as an amount of the evaporative gas generated per unit time increases.

According to the aforementioned configuration, as the amount of the evaporative gas generated per unit time increases, the recirculation amount of evaporative fuel increases, and a deviation in the air-fuel ratio A/F is likely to occur correspondingly in the high load-side operation range as well. On the other hand, the stop condition correction portion can widen toward the high load side the operation range in which the auxiliary motive power portion is operated by increasing the engine stop required reference value as the amount of the evaporative gas generated per unit time increases.

In the aforementioned configuration, the control apparatus may be equipped with an air temperature detection portion that detects an outside air temperature, a stop temperature acquisition portion that acquires an engine temperature of the internal combustion engine as a stop temperature, a stop time measurement portion that measures a stop time of the internal combustion engine according to the engine stop control, and a restart temperature estimation portion that estimates an engine temperature during restart of the internal combustion engine on a basis of the outside air temperature, the stop temperature, and the stop time.

According to the aforementioned configuration, when the internal combustion engine is restarted, the engine temperature during restart of the internal combustion engine can be estimated on the basis of the outside air temperature, the stop temperature, and the stop time. Accordingly, even when the engine temperature changes more irregularly than during continuous operation due to the influence of engine stop control, it is always possible to grasp the engine temperature with high accuracy. Thus, various kinds of control using the engine temperature can be performed with high accuracy even without employing a temperature sensor or the like.

In the aforementioned configuration, the engine stop portion may terminate the engine stop control to start the internal combustion engine when a start condition different from the stop condition is fulfilled.

According to the aforementioned configuration, the engine stop portion can start the internal combustion engine by terminating the engine stop control when a start condition different from the stop condition is fulfilled. Thus, a hysteresis can be added between the stop condition of the internal combustion engine and the start condition of the internal combustion engine. Accordingly, stable control can be performed while avoiding a state in which a changeover in control is repeated within a short time (the chattering of control).

In the aforementioned configuration, the fuel injection portion may be a direct injection-type fuel injection valve that injects fuel into a cylinder of the internal combustion engine.

According to the aforementioned configuration, in the direct injection-type fuel injection valve, the fuel that has adhered to the cylinder enters the oil pan. As a result, a relatively large amount of fuel is likely to be mixed with lubricating oil. In this case as well, the amount of the fuel that has been mixed with lubricating oil can be appropriately controlled by correcting the stop condition of engine stop control on the basis of the fuel mixture parameter.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 8 is a flowchart of control performed by the ECU in the third embodiment of the invention.

DETAILED DESCRIPTION OF EMBODIMENTS

Figure 1:
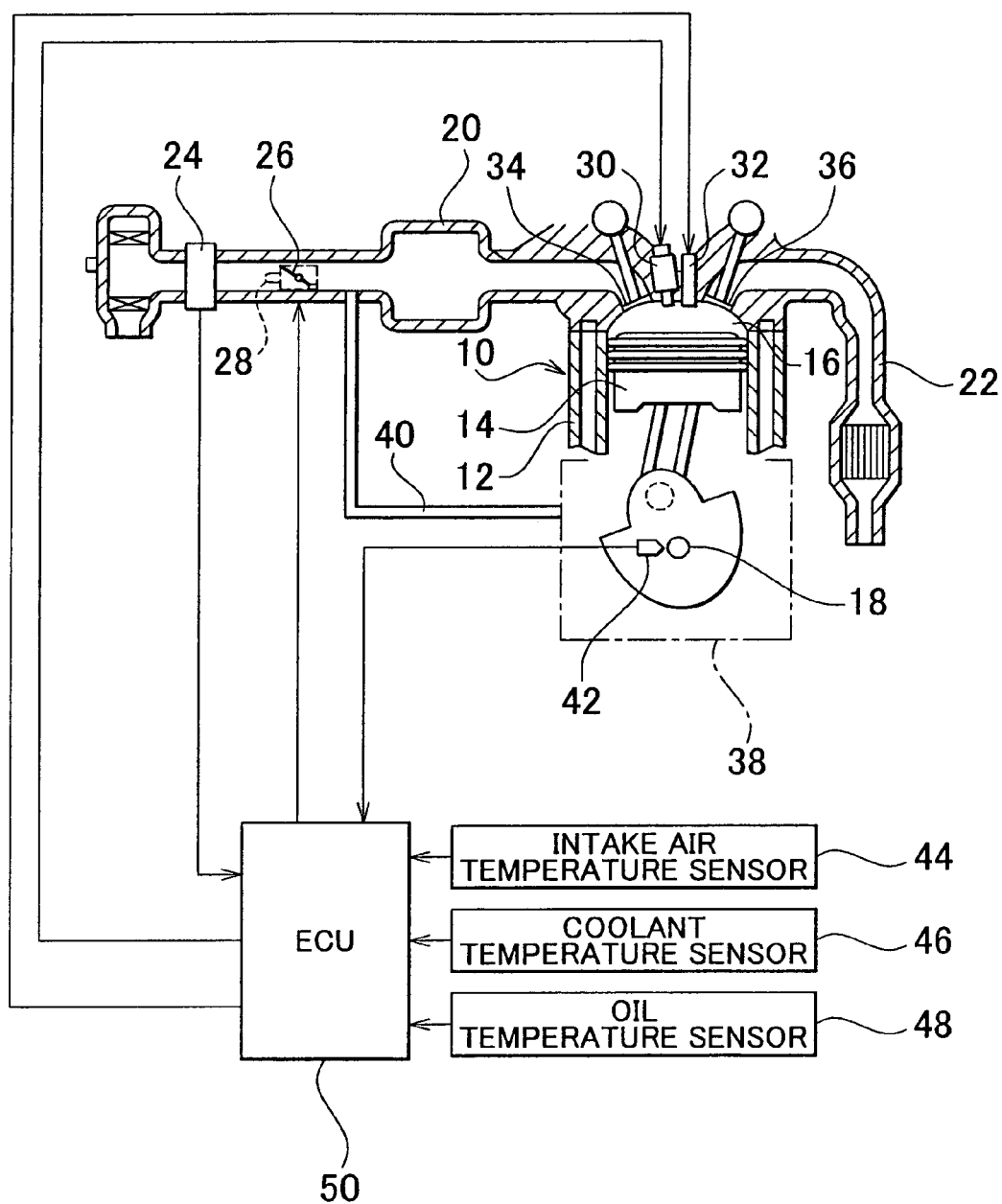
FIG. 1 is an overall schematic view for explaining a system configuration according to the first embodiment of the invention.

⟨First Embodiment⟩ ⟨Configuration of First Embodiment⟩ The first embodiment of the invention will be described hereinafter with reference to FIGS. 1 to 4. FIG. 1 is an overall schematic view for explaining a system configuration according to the first embodiment of the invention. The system according to the first embodiment of the invention is equipped with an internal combustion engine 10 designed as, for example, a direct injection-type multi-cylinder engine. It should be noted that one of a plurality of cylinders mounted in the internal combustion engine 10 is exemplified in FIG. 1.

Each cylinder 12 of the internal combustion engine 10 is provided with a combustion chamber 16 that increases and decreases in volume through reciprocating movements of a piston 14. The piston 14 is coupled to a crankshaft 18 as an output shaft of the internal combustion engine 10.

Further, the internal combustion engine 10 is equipped with an intake passage 20 that serves to suck intake air into each cylinder 12, and an exhaust passage 22 that serves to discharge exhaust gas from each cylinder 12. The intake passage 20 is provided with an airflow meter 24 as intake air amount detection means for detecting an intake air amount, and an electronically controlled throttle valve 26. The throttle valve 26 is driven by a throttle motor 28 on the basis of an accelerator opening degree or the like to increase/reduce the intake air amount. Further, each cylinder 12 of the internal combustion engine is provided with a fuel injection valve 30 as direct injection-type fuel injection means for directly injecting fuel into the combustion chamber 16, an ignition plug 32 that ignites a mixture in the combustion chamber 16, an intake valve 34 that opens/closes the intake passage 20 to/from the combustion chamber 16, and an exhaust valve 36 that opens/closes the exhaust passage 22 to/from the combustion chamber 16.

Further, the internal combustion engine 10 is equipped with a recirculation passage 40 as recirculation means for recirculating to the intake passage 20 evaporative gas of fuel that evaporates from lubricating oil in an oil pan 38 as will be described later. The recirculation passage 40 is designed such that the flow rate of the evaporative gas recirculated to the intake passage 20 through the recirculation passage 40 changes in accordance with the negative pressure in the intake passage 20 (an intake negative pressure).

Furthermore, the system according to the first embodiment of the invention is equipped with a sensor group including a crank angle sensor 42, an intake air temperature sensor 44, a coolant temperature sensor 46, an oil temperature sensor 48, and the like, and an electronic control unit (ECU) 50 that controls an operation state of the internal combustion engine 10. The crank angle sensor 42 outputs a signal synchronized with rotation of the crankshaft 18. The ECU 50 detects an engine rotational speed on the basis of an output of the crank angle sensor 42.

Further, the intake air temperature sensor 44 detects a temperature of intake air (an outside air temperature), and constitutes air temperature detection means. On the other hand, the coolant temperature sensor 46 detects a temperature of coolant for the internal combustion engine (a coolant temperature Tw). The oil temperature sensor 48 detects a temperature of lubricating oil in the oil pan 38 (an oil temperature To). These two sensors, namely, the coolant temperature sensor 46 and the oil temperature sensor 48 constitute engine temperature acquisition means for acquiring the coolant temperature Tw or the oil temperature To as an engine temperature. It should be noted that the invention may adopt a configuration in which the oil temperature To is acquired in an estimative manner on the basis of an operation state of the internal combustion engine as will be described later, instead of employing, for example, the oil temperature sensor 48.

In addition to the airflow meter 24 and the respective sensors 42, 44, 46, and 48, various sensors necessary for the control of the vehicle and the internal combustion engine (e.g., an accelerator opening degree sensor that detects an accelerator opening degree, an air-fuel ratio sensor that detects an air-fuel ratio of exhaust gas, and the like) are included in the aforementioned sensor group. These sensors are connected to an input side of the ECU 50. Further, various actuators including the throttle motor 28, the fuel injection valve 30, the ignition plug 32, and the like are connected to an output side of the ECU 50.

While detecting the operation state of the internal combustion engine by means of the sensor group, the ECU 50 then drives the respective actuators. More specifically, the ECU 50 sets a fuel injection amount, a fuel injection timing, an ignition timing, and the like on the basis of outputs of the sensor group, and the respective actuators are driven in accordance with these set contents. Operation control performed by this ECU 50 includes idle stop control and stop condition correction control, which will be described hereinafter.

⟨Idle Stop Control⟩ Idle stop control is a kind of engine stop control (engine stop control) for temporarily stopping the internal combustion engine with a view to improving, for example, fuel consumption performance, exhaust gas emission properties, and the like. Then, in idle stop control, when the vehicle assumes an idle operation state and a predetermined stop condition is fulfilled, the internal combustion engine is automatically stopped. The following conditions (1) to (3) and the like can be mentioned as examples of the stop condition. The condition (1) is that the engine temperature of the internal combustion engine be equal to or higher than a stop permission temperature. The condition (2) is that the voltage of a battery be held high enough. The condition (3) is that idle operation be continued for a predetermined time or more.

In the aforementioned stop condition (1), the engine temperature is a generic designation of the coolant temperature Tw of the internal combustion engine or the oil temperature To of lubricating oil. In the following description, when either the coolant temperature Tw or the oil temperature To may be used as a control parameter, these temperatures will be comprehensively described as "the engine temperature".

Further, the stop permission temperature in the stop condition (1) is variably set in accordance with the states of the vehicle and the internal combustion engine. For example, when the ECU 50 does not sufficiently perform various kinds of learning control (the control of learning the fuel injection amount, the control of learning the fuel injection timing, and the like) in an idle operation range, the stop permission temperature is set higher than usual. Thus, the temperature range in which idle stop control is not performed is widened. Therefore, the duration time and frequency of idle operation (i.e., the number of opportunities to perform learning control) can be increased. Further, when the performance of an on-vehicle machine such as a heater or the like is insufficient or when the internal combustion engine is warmed up to a maximum possible extent in winter or the like as well, the stop permission temperature is set higher than usual.

Meanwhile, in the direct injection-type internal combustion engine 10, injected fuel is likely to adhere to a wall surface of a cylinder especially during operation at low temperatures. Part of the fuel that has adhered to the cylinder enters the oil pan 38 through a gap between the piston 14 and the wall surface of the cylinder, and is mixed with lubricating oil. When this fuel is accumulated in lubricating oil, a large amount of fuel is likely to evaporate from lubricating oil during warm-up operation or the like. When an air-fuel ratio A/F of the mixture fluctuates from an appropriate value upon recirculation of this evaporative gas to the combustion chamber 16 via the recirculation passage 40, the evaporative gas constitutes a factor in a so-called deviation in an air-fuel ratio A/F.

Besides, in the vehicle in which engine stop control such as idle stop control or the like is performed, when engine stop control is performed during operation, the combustion in the internal combustion engine as a heat generation source is stopped to cause a great change in the engine temperature. Thus, in the vehicle in which engine stop control is performed, it is difficult to accurately control the recirculation amount of evaporative gas according to any conventional control method. Thus, in this first embodiment of the invention, stop condition correction control is performed as will be described hereinafter.

⟨Stop Condition Correction Control⟩ In this correction control, the stop permission temperature as one of stop conditions of idle stop control is corrected in accordance with an oil dilution ratio K and an engine temperature. Thus, the oil dilution ratio K can be controlled as will be described later by adjusting the temperature range in which idle stop control is performed. That is, the stop permission temperature is so corrected as to reduce the oil dilution ratio K and restrict the state of combustion from changing due to the recirculation of evaporative gas. It should be noted herein that the oil dilution ratio K is a fuel mixture parameter corresponding to the amount of the fuel that has been mixed with lubricating oil, and represents a ratio of the dilution of lubricating oil through the mixture of fuel. Further, the oil dilution ratio K is acquired on the basis of an operation state of the internal combustion engine or the like according to a method that will be described later.

(Correction Based on Oil Dilution Ratio) First of all in stop condition correction control, when the oil dilution ratio K becomes higher than a predetermined reference value Klow, the stop permission temperature is raised more than usual. In this case, the term "usual" refers to a case where the oil dilution ratio K is equal to or lower than the reference value Klow. Further, the reference value Klow is defined as a maximum value of the oil dilution ratio K that can confine the deviation in the air-fuel ratio A/F of the mixture within a permissible range through the effect of, for example, stop condition correction control, and is stored in advance in the ECU 50.

As described above, when the stop permission temperature is raised, the temperature range in which idle operkion is permitted is correspondingly widened. As a result, the duration time and frequency of idle operation are increased. Therefore, the engine temperature can be held relatively high. Accordingly, when the oil dilution ratio K becomes higher than a relatively high level, namely, the reference value Klow, the stop permission temperature is raised to make it possible to reduce the frequency of operation at low temperatures at which injected fuel is likely to be mixed with lubricating oil and to restrain the oil dilution ratio K from increasing due to low-temperature operation.

Figure 2:
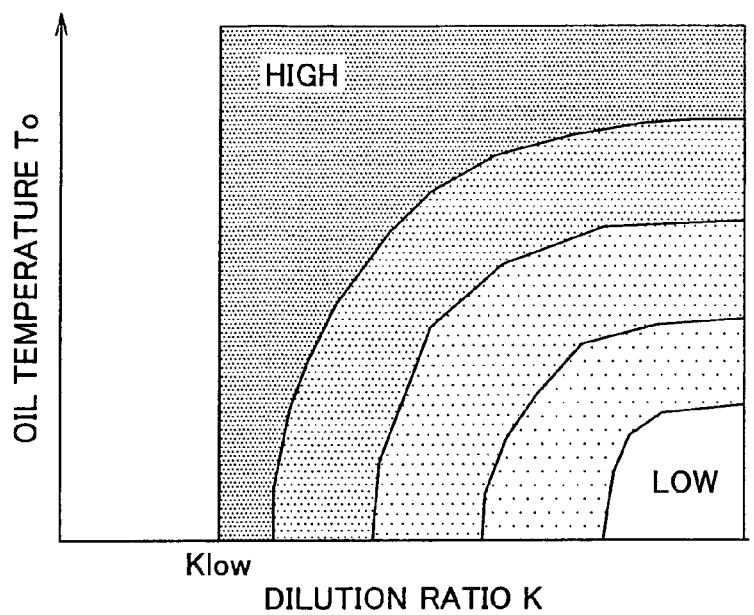
FIG. 2 is a characteristic diagrammatic view showing a stop permission temperature map that is stored in advance in an ECU.

Further, it is determined on the basis of a stop permission temperature map shown in FIG. 2 how much the stop permission temperature is raised while the oil dilution ratio K remains higher than the reference value Klow. FIG. 2 is a characteristic diagrammatic view showing the stop permission temperature map stored in advance in the ECU. As shown in FIG. 2, the value of the stop permission temperature is determined on the basis of the oil dilution ratio K and the engine temperature. It should be noted that the oil temperature To of lubricating oil is exemplified as the engine temperature in this first embodiment of the invention.

First of all, a relationship between the correction amount of the stop permission temperature and the oil dilution ratio K will be described. In stop condition correction control, as shown in FIG. 2, the width of the rise in the stop permission temperature is reduced as the oil dilution ratio K increases beyond the reference value Klow. That is, the stop permission temperature is set higher than usual as soon as the oil dilution ratio K becomes higher than the reference value Klow. The stop permission temperature is designed to fall as the oil dilution ratio K increases while remaining higher than the reference value Klow.

This is because the generation amount of evaporative gas of fuel is small and hence the recirculation of evaporative gas has little influence on the air-fuel ratio A/F even when the oil temperature of lubricating oil is raised in the case where the oil dilution ratio K is small (low). Accordingly, in this case, the stop permission temperature is considerably raised to positively perform idle operation and promote the evaporation of the fuel contained in lubricating oil. Thus, the oil dilution ratio K can be swiftly reduced without affecting the air-fuel ratio A/F.

On the other hand, when the oil dilution ratio K is large (high), the width of the rise in the stop permission temperature is held small to prevent evaporative gas of fuel from being rapidly generated. That is, the duration time and frequency of idle operation are appropriately increased to prevent the oil temperature from considerably rising in a short time. Thus, the oil temperature can be relatively slowly raised. Therefore, the fuel in lubricating oil can be evaporated at such an appropriate pace as not to cause the deviation in the air-fuel ratio A/F. Accordingly, the air-fuel ratio A/F can be stabilized even while steadily reducing the oil dilution ratio K.

Figure 3:
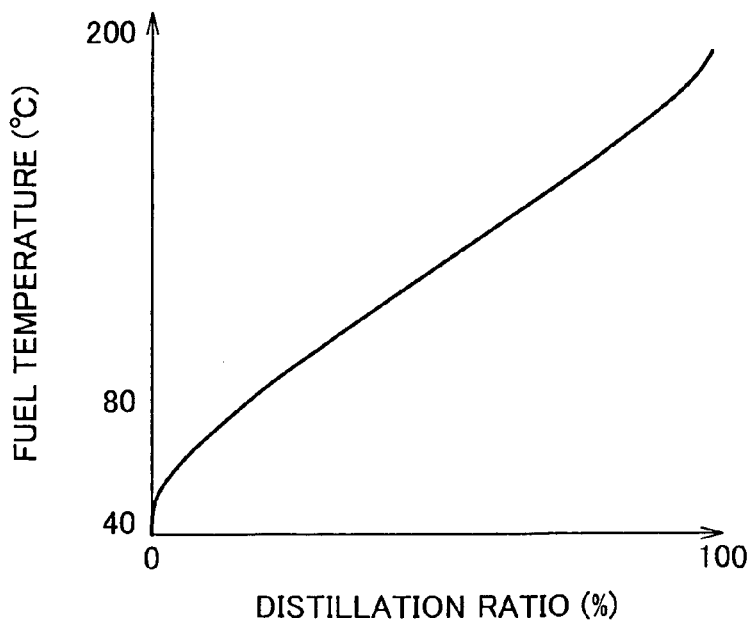
FIG. 3 is a characteristic diagrammatic view showing a relationship between a distillation ratio of fuel and a temperature of fuel.

(Correction Based on Engine Temperature) Next, a relationship between the correction amount of the stop permission temperature and the engine temperature (the oil temperature) will be described. In stop condition correction control, as shown in FIG. 2, the width of the rise in the stop permission temperature is designed to be increased as the oil temperature rises while the oil dilution ratio K remains higher than the reference value Klow. FIG. 3 is a characteristic diagrammatic view showing a relationship between the evaporation ratio of fuel and the temperature of fuel. As shown in FIG. 3, even when the oil dilution ratio K is constant, the generation amount of evaporative gas of fuel increases as the width of the rise in temperature increases. Accordingly, when the oil temperature is low, the progress of warm-up of the internal combustion engine causes a considerable rise in the oil temperature from a low temperature to a constant temperature after warm-up (e.g., about 90° C.). A relatively large amount of evaporative gas is generated as a result of this rise in temperature.

Thus, when the oil temperature is low, the width of the rise in the stop permission temperature is set small to curb the speed of the rise in the engine temperature. Evaporative gas of fuel can thereby be prevented from being rapidly generated. Thus, the oil dilution ratio K can be steadily reduced while avoiding a deviation in the air-fuel ratio A/F. On the other hand, when the oil temperature is high, the width of the rise in temperature is small until the oil temperature reaches the constant temperature after warm-up. Therefore, there is no need to consider an abrupt increase in the amount of evaporative gas resulting from a considerable rise in the oil temperature. Thus, the fuel in lubricating oil can be swiftly evaporated by considerably raising the stop permission temperature.

⟨Idle Limitation Control (Idle Prohibition Control)⟩ When the internal combustion engine assumes a certain operation state, a sufficient effect may not be achieved despite the performance of the aforementioned stop condition correction control. Thus, in the first embodiment of the invention, when the oil dilution ratio K becomes higher than a predetermined upper limit Koc, the internal combustion engine is stopped, if possible, to limit (substantially prohibit) idle operation regardless of the state of fulfillment of the stop condition (1). It should be noted herein that the expression "to substantially prohibit" means the prohibition of idle operation except in the case where a minimum duration of idle operation is needed to maintain the performance of the vehicle. Further, the upper limit Koc is defined as, for example, a high level of the oil dilution ratio K at which a deviation in the air-fuel ratio A/F is about to occur. Therefore, this dilution ratio cannot be reached as long as the effect of stop condition correction control is sufficient. Accordingly, the upper limit Koc is set as a value larger than the reference value Klow (Koc>Klow), and is stored in advance in the ECU 50 together with the reference value Klow.

When the oil dilution ratio K becomes higher than the upper limit Koc, a deviation in the air-fuel ratio A/F is likely to occur especially in a low-output range in which the amount of intake air is small. It is therefore preferable to refrain from idle operation if possible. Thus, in this case, even when the engine temperature is equal to or lower than the stop permission temperature, idle stop control is performed within such a range as not to hinder the basic performance of the vehicle, thereby stopping the internal combustion engine (prohibiting idle operation). It should be noted herein that such a range as not to hinder the basic performance of the vehicle means a range satisfying normal startability and running performance. To be more specific, for example, when the stop condition (2) is not fulfilled, the battery voltage needs to be ensured, and idle operation is therefore permitted to the minimum possible extent. On the other hand, the correction or the like of the stop permission temperature with a view to promoting the opportunities, for example, to maintain the performance of an on-vehicle machine and perform learning control is ignored as long as the oil dilution ratio K is higher than the upper limit Koc.

According to idle limitation control, even if the effect of stop condition correction control cannot be sufficiently achieved, idle operation can be performed as an emergency measure only when absolutely necessary. Thus, the properties of exhaust gas emission can be restrained from deteriorating due to a deviation in the air-fuel ratio A/F. It should be noted that although the configuration in which idle limitation control is performed on the basis of the oil dilution ratio K is exemplified in this first embodiment of the invention, it is also appropriate to adopt a configuration in which idle limitation control is performed on the basis of the oil dilution ratio K and the engine temperature (e.g., the oil temperature To) as shown in the later-described second embodiment of the invention.

⟨Oil Dilution Ratio Estimation Control⟩ In the aforementioned respective kinds of control, the oil dilution ratio K is calculated by calculating fuel dilution amounts resulting from fuel injection each time using, for example, a load ratio of the internal combustion engine, a fuel injection amount, a fuel injection cycle, a fuel injection timing, a coolant temperature and the like as parameters, and integrating the calculated values. This calculation method is generally known as described in, for example, Japanese Patent Application Publication No. 2003-322047 (JP-A-2003-322047) and Japanese Patent Application Publication No. 2004-293394 (JP-A-2004-293394).

Further, as described in, for example, Japanese Patent Application Publication No. 2008-298001 (JP-A-2008-298001), it is also appropriate to adopt a configuration in which an oil dilution ratio (a dilution amount) is estimated on the basis of an intake air amount of an internal combustion engine and an exhaust gas air-fuel ratio of the internal combustion engine. In addition, as described in, for example, Japanese Patent Application Publication No. 10-317936 (JP-A-10-317936), it is also appropriate to adopt a configuration in which an oil dilution degree is estimated on the basis of a concentration of hydrocarbons in blow-by gas, a pressure in a crankcase, an acoustic velocity, an infrared absorption ratio, a viscosity of lubricating oil, a PH value, an electric resistance, a capacitance, and the like.

⟨Oil Temperature Acquisition Control⟩ Next, a method of acquiring an oil temperature without employing the oil temperature sensor 48 will be described. In this first embodiment of the invention, it is also appropriate to adopt a configuration in which an oil temperature is acquired in an estimative manner according to any one of the following acquisition methods (1) to (3) instead of employing the oil temperature sensor 48. It should be noted that these acquisition methods are generally known. (1) Characteristic data obtained by expressing a relationship among an oil temperature of lubricating oil, a coolant temperature during the start of the engine, and an integral value of a fuel injection amount since the start of the engine in the form of data are stored in advance in the ECU. The oil temperature is calculated from these characteristic data on the basis of the coolant temperature during the start of the engine and the integral value of the fuel injection amount. (2) Characteristic data obtained by expressing a relationship among an oil temperature of lubricating oil, a coolant temperature during the start of the engine, and an elapsed time since the start of the engine in the form of data are stored in advance in the ECU. The oil temperature is calculated from these characteristic data on the basis of the coolant temperature during the start of the engine and the elapsed time. (3) Influences of the combustion in the cylinder, heat exchange with coolant, and heat exchange with outside air on an oil temperature of lubricating oil are converted into a mathematical expression, and the oil temperature is calculated on the basis of this mathematical expression.

⟨Concrete Processing Procedure for Realizing First Embodiment⟩

Figure 4:
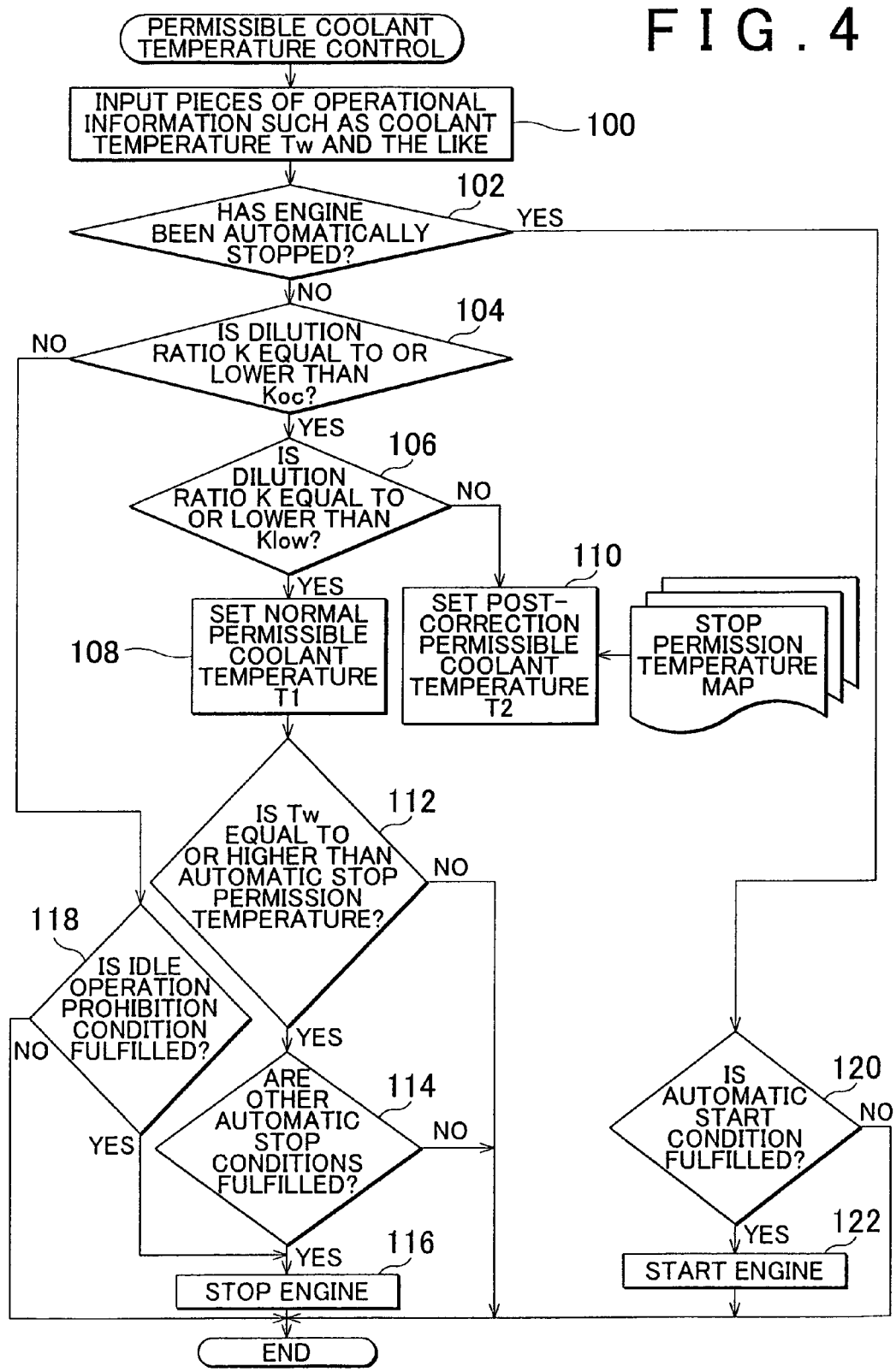
FIG. 4 is a flowchart of control performed by the ECU in the first embodiment of the invention.

FIG. 4 is a flowchart of the control performed by the ECU in the first embodiment of the invention. In a route shown in FIG. 4, various pieces of operation information including the engine rotational speed, the intake air amount, the coolant temperature Tw, the oil temperature To, and the like are first acquired on the basis of signals input from the sensor group (step 100). In a processing of step 100, a processing of calculating the load ratio and the oil dilution ratio K on the basis of the acquired pieces of operation information is also included. It is then determined whether or not the internal combustion engine has already been automatically stopped (during idle stop control) (step 102). Then, when the result of this determination is positive, a transition to later-described step 120 is made to perform a start determination processing.

On the other hand, when the result of the determination in step 102 is negative, it is first determined whether or not the oil dilution ratio K is equal to or lower than the upper limit Koc (step 104). When the result of this determination is negative, the oil dilution ratio K is extremely high and a prompt measure is required. Therefore, a transition to later-described step 118 is made to perform idle limitation control. Further, when the result of the determination in step 104 is positive, the oil dilution ratio K is not high enough to take a prompt measure. Therefore, it is then determined whether or not the oil dilution ratio K is equal to or lower than the reference value Klow (step 106).

Then, when the result of the determination in step 106 is positive, the oil dilution ratio K is confined to a normal range. Therefore, a permissible coolant temperature T1 during normal operation that is stored in advance in the ECU 50 is set as a final stop permission temperature (step 108). Further, when the result of the determination in step 106 is negative, the degree of the necessity to adjust the oil dilution ratio K is high. Therefore, a permissible coolant temperature T2 corrected through the aforementioned stop condition correction control (see FIG. 2) is set as a final stop permission temperature (step 110).

It is then determined in step 112 whether or not the coolant temperature Tw is equal to or higher than the stop permission temperature. When the result of the determination in step 112 is positive, it is determined whether or not other stop conditions such as the aforementioned stop conditions (2) and (3) are fulfilled (step 114). When the results of step 112 and step 114 are both positive, idle stop control is performed to stop the internal combustion engine (step 116). Further, when one of the results of the determinations in step 112 and step 114 is negative, the processing procedure is terminated without performing engine stop control.

On the other hand, when the result of the aforementioned determination in step 104 is negative, it is determined whether or not a predetermined idle operation prohibition condition is fulfilled (step 118). As described above, the idle operation prohibition condition is a condition for determining whether or not idle operation can be prohibited within such a range as not to hinder the basic performance of the vehicle. Then, when the result of the determination in step 118 is positive, the internal combustion engine is stopped in step 116. Further, when the result of the determination in step 118 is negative, idle operation is permitted to the minimum possible extent without performing the processing of step 116.

In addition, when the result of the aforementioned determination in step 102 is positive, the internal combustion engine has already been stopped. It is therefore determined whether or not a start condition for starting the internal combustion engine is fulfilled (step 120). An example of this start condition can be mentioned as a condition that an operation for causing the vehicle to run be performed by a driver, a condition that an air-fuel ratio A/F sensor be activated, or the like. Then, when the result of the determination in step 120 is positive, the internal combustion engine is started (step 122).

As described above, according to this first embodiment of the invention, the stop condition of idle stop control is corrected on the basis of the oil dilution ratio and the engine temperature. The temperature range in which idle stop control is performed can be enlarged or narrowed in accordance with this correction. Thus, the oil dilution ratio can be controlled to a desired level by appropriately adjusting the frequency of the performance of idle stop control and the duration time of idle stop control. Accordingly, in the direct injection-type internal combustion engine in which the oil dilution ratio is likely to rise, the oil dilution ratio can be confined to a permissible range even when idle stop control is performed. Then, a change in combustion such as a deviation in the air-fuel ratio A/F or the like can be suppressed even while recirculating evaporative gas of fuel to an intake system. Thus, the state of combustion can be stabilized.

⟨Second Embodiment⟩ Next, the second embodiment of the invention will be described with reference to FIG. 5. In this second embodiment of the invention, a system configuration identical to that of the foregoing first embodiment of the invention (FIG. 1) is adopted. On the other hand, the second embodiment of the invention is different from the first embodiment of the invention in the control contents that will be described below. It should be noted that the same components as in the foregoing first embodiment of the invention are denoted by the same reference symbols respectively and the description of those components is omitted in the second embodiment of the invention.

⟨Features of Second Embodiment⟩ (Condition for Making Determination on Idle Limitation Control) In this second embodiment of the invention, when the following determination conditions (1) and (2) are both fulfilled, idle limitation control identical to that of the first embodiment of the invention is performed. The determination condition (1) is that the oil dilution ratio K be higher than the upper limit Koc. The determination condition (2) is that the engine temperature (e.g., the oil temperature To) be higher than a predetermined temperature reference value Toc.

The aforementioned determination condition (1) is the same as in the first embodiment of the invention. When the determination condition (1) is fulfilled, the oil dilution ratio K is high enough to necessitate a prompt measure. Even in this state, however, when the temperature is low, the volatility of fuel decreases, and the amount of evaporative gas evaporating from lubricating oil does not notably increase. Thus, in this second embodiment of the invention, for example, an oil temperature at which the generation amount of evaporative gas starts to increase is set in advance as the temperature reference value Toc. Even when the determination condition (1) is fulfilled, idle limitation control is not performed unless the determination condition (2) is fulfilled. According to this configuration, even in the case where the oil dilution ratio K is high, idle operation can be performed without limitation when the internal combustion engine is at a low temperature. Accordingly, idle operation can be restrained from being limited beyond necessity even while performing idle limitation control at appropriate timings.

(Oil Temperature Estimation Control during Restart) As described above, when the predetermined start condition is fulfilled during automatic stop of the internal combustion engine, idle stop control is terminated to restart the internal combustion engine. At this moment, the oil temperature of lubricating oil has fallen correspondingly to the stop time of the engine, and displays a behavior different from a behavior in the case where the operation of the engine is continued. Thus, in this second embodiment of the invention, the oil temperature during the restart of the internal combustion engine is estimated in consideration of the stop time of the internal combustion engine.

To be more specific, first of all, when the internal combustion engine is stopped through idle stop control, a stop oil temperature Tos as an oil temperature of lubricating oil that is detected or estimated upon the stop of the internal combustion engine is stored into the ECU 50. It should be noted herein that the stop oil temperature Tos can be estimated on the basis of the amount of fuel consumed, for example, from the start of the engine to the performance of idle stop control (as a concrete example, the integral value of the intake air amount and the integral value of the fuel injection amount from the start of the engine). Further, during the stop of the internal combustion engine, an idle stop time S as an elapsed time from the timing of the stop of the engine is measured, and an average intake air temperature Ta as a time average of the intake air temperature (the outside air temperature) detected by the intake air temperature sensor 44 is calculated.

It should be noted herein that the oil temperature after the stop of the engine gradually falls from the stop oil temperature Tos as the idle stop time S increases. The fall in the temperature in this case increases as the atmospheric temperature such as the outside air temperature or the like falls. These relationships are expressed in the form of data to be stored in advance in the ECU 50 as map data, functional expressions, or the like.

Thus, when the internal combustion engine is restarted, the oil temperature To during the restart of the internal combustion engine can be estimated on the basis of the aforementioned stop oil temperature Tos, the aforementioned idle stop time S, and the aforementioned average intake air temperature Ta. According to this configuration, even when the oil temperature of lubricating oil changes more irregularly than during continuous operation due to the influence of idle stop control, the oil temperature can always be grasped with high accuracy. Accordingly, even when the oil temperature sensor or the like is not employed, various kinds of control using the oil temperature can be performed with high accuracy.

Figure 5:
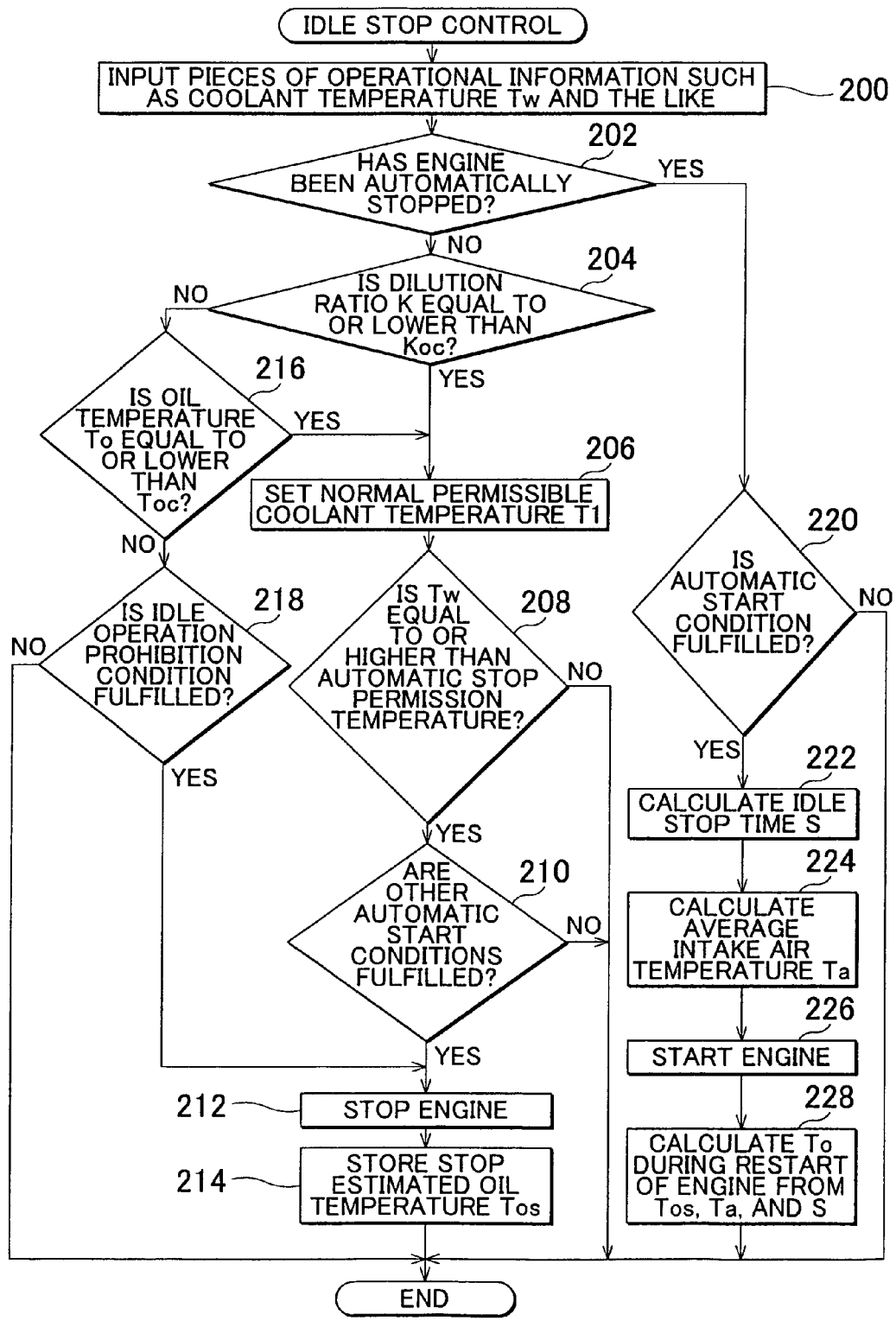
FIG. 5 is a flowchart of control performed by the ECU in the second embodiment of the invention.

⟨Concrete Processing for Realizing Second Embodiment⟩ FIG. 5 is a flowchart of the control performed by the ECU in the second embodiment of the invention. In a routine shown in FIG. 5, first of all in steps 200 to 204, determination processings identical to steps 100 to 104 of the first embodiment of the invention are performed.

Then, when the result of the determination in step 204 is positive, the permissible coolant temperature T1 during normal operation is set as a final stop permission temperature (step 206). It should be noted that the invention may adopt a configuration in which stop condition correction control identical to that of the first embodiment of the invention (steps 106 to 110) is performed in step 206 to set one of the permissible coolant temperatures T1 and T2 as a final stop permission temperature in accordance with a relationship in magnitude between the oil dilution ratio K and the reference value Klow. Then in steps 208 to 212, processings identical to those of steps 112 to 116 of the first embodiment of the invention are performed to stop the internal combustion engine in accordance with the state of fulfillment of the stop condition. Then, when the engine is stopped, the aforementioned stop oil temperature Tos is acquired and stored (step 214).

Further, when the result of the determination in step 204 is negative, it is determined whether or not the oil temperature To is equal to or lower than the temperature reference value Toc (step 216). When the result of this determination is positive, a return to the aforementioned step 206 is made because the oil temperature is low even though the oil dilution ratio K is extremely high. On the other hand, when the result of the determination in step 216 is negative, determination conditions (1) and (2) for idle limitation control in this second embodiment of the invention are fulfilled. In this case, therefore, as is the case with the first embodiment of the invention, the internal combustion engine is stopped when an idle operation prohibition condition is fulfilled (step 218).

On the other hand, when the result of the determination in step 202 is positive, it is determined whether or not an automatic start condition is fulfilled (step 220) as is the case with step 120 of the first embodiment of the invention. Then, when the result of this determination is positive, the aforementioned oil temperature estimation control during the restart of the internal combustion engine is performed to start the internal combustion engine in steps 222 to 228. That is, the idle stop time S is calculated in step 222, and the average intake air temperature Ta is calculated in step 224. Further, in step 228, the oil temperature To during the restart of the internal combustion engine is calculated by referring to the characteristic data stored in the ECU 50, on the basis of the stop oil temperature Tos, the idle stop time S, and the average intake air temperature Ta. In this second embodiment of the invention thus configured as well, an operation and an effect that are substantially identical to those of the first embodiment of the invention can be obtained.

⟨Third Embodiment⟩ Next, the third embodiment of the invention will be described with reference to FIGS. 6 to 8. This third embodiment of the invention is characterized by being applied to a hybrid vehicle employing both an internal combustion engine and a motor as motive power sources. It should be noted that the same components as in the foregoing first embodiment of the invention are denoted by the same reference symbols respectively and the description of those components is omitted in this third embodiment of the invention.

Figure 6:
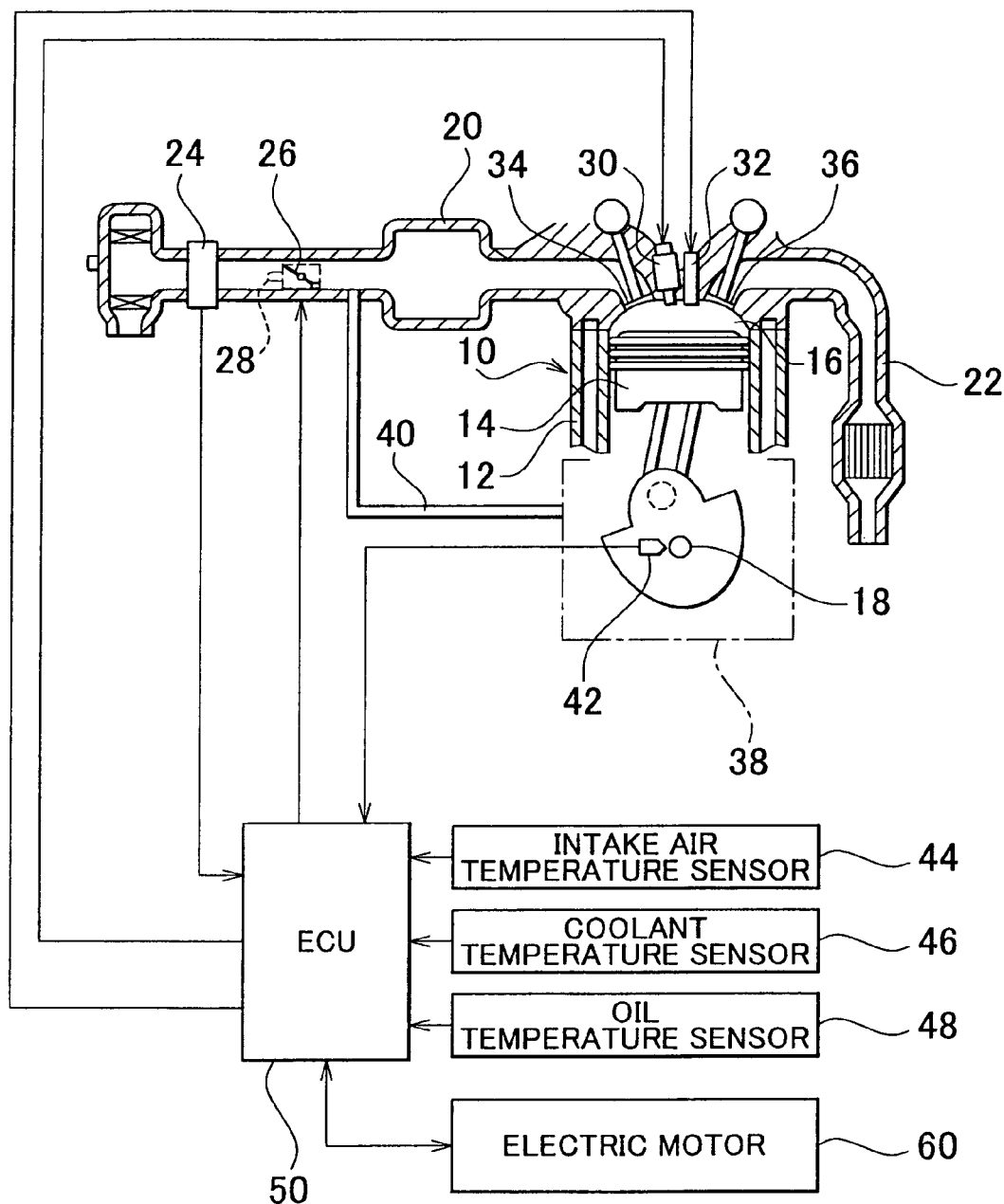
FIG. 6 is an overall schematic view for explaining a system configuration according to the third embodiment of the invention.

(Features of Third Embodiment) FIG. 6 is an overall schematic view for explaining a system configuration according to the third embodiment of the invention. As shown in FIG. 6, a vehicle according to the third embodiment of the invention is equipped with an electric motor 60 as auxiliary motive power means for generating a motive power at least when the internal combustion engine 10 is stopped, and is designed as a so-called hybrid vehicle.

Figure 7:
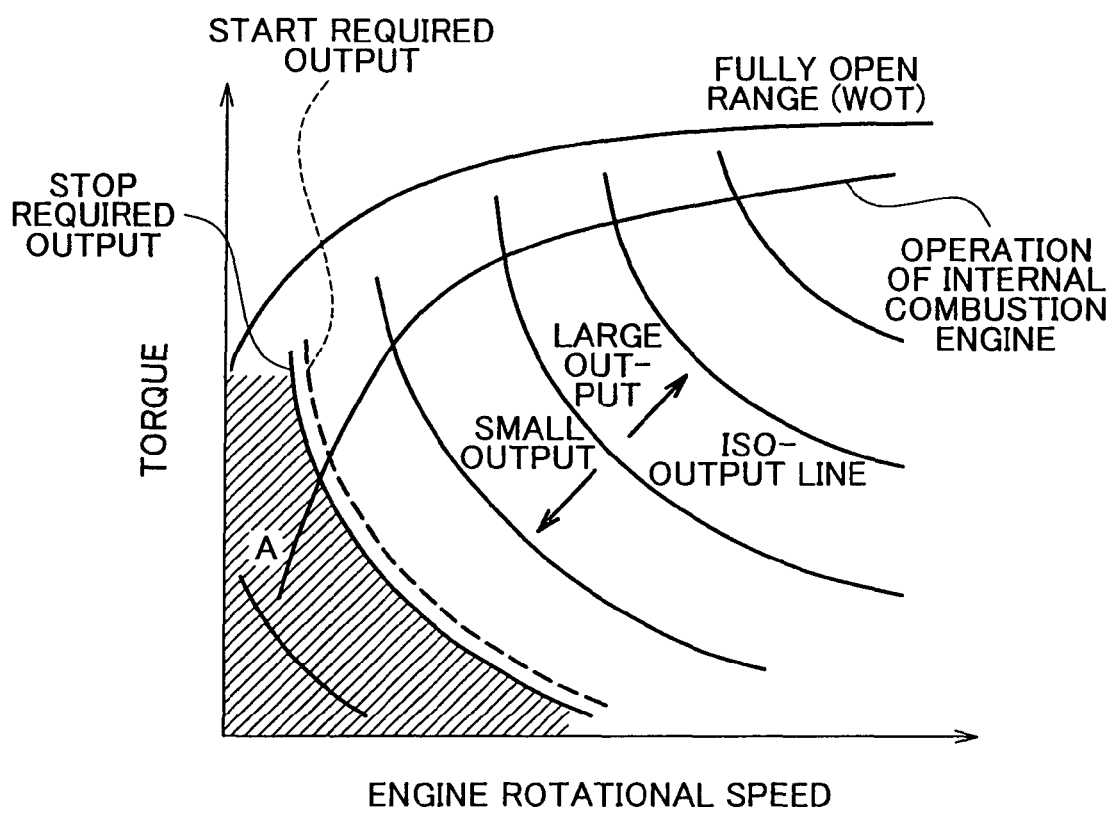
FIG. 7 is an illustrative view showing an engine running range of a hybrid vehicle and a motor running range of the hybrid vehicle in the third embodiment of the invention.

FIG. 7 is an illustrative view showing an engine running range of the hybrid vehicle and a motor running range of the hybrid vehicle in the third embodiment of the invention. This illustrative view shows an example of running characteristics, and is modeled for easy understanding. As shown in FIG. 7, in this third embodiment of the invention, for example, in an operation range from intermediate loads to high loads, the internal combustion engine 10 is operated with the electric motor 60 stopped, thereby carrying out engine running attaching importance to output. On the other hand, in a low-load operation range (a shaded region in FIG. 7), a large output of the internal combustion engine is not always required, and the properties of exhaust gas emission are likely to fluctuate due to a small intake air amount. Thus, in the low-load operation range, the electric motor 60 is operated with the internal combustion engine 10 stopped, thereby carrying out motor running attaching importance to fuel consumption and the properties of exhaust gas emission.

Changeover control for making a changeover from the aforementioned engine running to the aforementioned motor running constitutes engine stop control according to this third embodiment of the invention, and is performed when a predetermined stop condition determined on the basis of, for example, the operation states of the vehicle and the internal combustion engine, the state of charge of the battery, and the like is fulfilled. An example of this stop condition is that "the required driving force of the vehicle be smaller than an engine stop required reference value engstop (hereinafter referred to as a stop required output engstop)". It should be noted herein that the stop required output engstop is a lower limit of the engine output at which engine running is more advantageous than motor running. As shown in FIG. 7, the stop required output engstop is expressed as one of iso-output lines obtained by connecting points at which the output of the internal combustion engine is constant.

For example, when the required driving force of the vehicle becomes smaller than the stop required output engstop (a region A) while the internal combustion engine operates on an operation line in FIG. 7, motor running is more advantageous than engine running from the standpoint of fuel consumption and the properties of exhaust gas emission. In this case, therefore, the internal combustion engine is stopped to make a changeover from engine running to motor running. It should be noted that the operation of controlling the distribution ratio between the motive powers of the internal combustion engine and the motor while operating both the internal combustion engine and the motor during engine running (HV operation) may be performed when the hybrid vehicle has a certain specification or the like. During this HV operation, the internal combustion engine is stopped with the driving of the motor maintained, thereby performing changeover control from engine running to motor running. Further, in this third embodiment of the invention, later-described stop condition correction control is performed to correct the stop required output engstop as the stop condition of the aforementioned changeover control (engine stop control) in accordance with the oil dilution ratio K and the engine temperature.

On the other hand, changeover control from motor running to engine running is performed when the required driving force of the vehicle becomes larger than a start required output engstart. It should be noted herein that the start required output engstart is obtained by adding a predetermined hysteresis value enghi to the stop required output engstop, and is set according to an expression (1) shown below.

$$engstart = engstop + enghi \quad (1)$$

According to this configuration, the stop required output engstop and the start required output engstart are criterial values different from each other. Therefore, a hysteresis can be added to the operation of making a changeover between engine running and motor running (between the condition of stopping the internal combustion engine and the condition of starting the internal combustion engine). Thus, a state of repetition of the changeover of control within a short time (the chattering of control) is avoided to make it possible to perform control stably.

⟨Stop Condition Correction Control⟩ Evaporative gas of the fuel that has evaporated from lubricating oil is recirculated to the intake system. Even when this recirculation amount is constant, the ratio of the amount of evaporative fuel to the amount of air increases correspondingly to the small intake air amount, and a deviation in the air-fuel ratio A/F is likely to occur in the low-load operation range. Besides, when the generation amount of evaporative gas per unit time increases, the concentration of fuel in recirculated gas increases. As a result, a deviation in the air-fuel ratio A/F becomes likely to occur correspondingly in the high-load operation range as well, and the operation range unsuited for engine running is enlarged toward the high-load side.

Thus, in stop condition correction control, the control of increasing the stop required output engstop to enlarge the operation range for carrying out motor running toward the high-load side as the amount of the evaporative gas generated per unit time increases is performed. To be more specific, the amount of the evaporative gas generated per unit time increases as the oil dilution ratio K increases and as the engine temperature rises. Therefore, in stop condition correction control, the stop required output engstop is increased as the oil dilution ratio K increases or as the engine temperature rises.

In this case, the post-correction stop required output engstop is set as a lower limit of the engine output that allows the amount of a deviation in the air-fuel ratio A/F to be confined to a permissible range even when evaporative gas is recirculated to the intake system in an amount corresponding to the oil dilution ratio K and the engine temperature. Then, in an operation range in which the required driving force of the vehicle is smaller than the stop required output engstop, motor running is carried out through the aforementioned changeover control, and engine running is prevented from being carried out in the low-load operation range in which a deviation in the air-fuel ratio A/F is likely to occur. That is, according to this control, the stop required output engstop is corrected such that the internal combustion engine operates only in the operation range in which the change in the state of combustion resulting from the recirculation of evaporative gas is confined to a permissible range and that the internal combustion engine stops in the other operation ranges.

⟨Concrete Processing Procedure for Realizing Third Embodiment⟩ FIG. 8 is a flowchart of the control performed by the ECU in the third embodiment of the invention. A routine shown in FIG. 8 is repeatedly executed while a power supply of the ECU 50 is on. In the routine shown in FIG. 8, it is first determined whether or not the oil temperature To is higher than the temperature reference value Toc (step 300). When the result of this determination is positive, it is determined whether or not the oil dilution ratio K is higher than the upper limit Koc (step 302). These determination processings are substantially identical to steps 204 and 216 of the second embodiment of the invention (FIG. 5) respectively. That is, when the determinations in steps 300 and 302 are made, stop condition correction control can thereby be performed only in a situation in which a deviation in the air-fuel ratio A/F needs to be promptly avoided. As a result, an operation and an effect that are substantially identical to those of the second embodiment of the invention can be obtained.

Then, when the result of the determination in step 300 is negative, the internal combustion engine is cold. Therefore, the value of the stop required output engstop is set to an output value engstopc during cold operation (step 304). Further, when the result of the determination in step 302 is negative, the oil dilution ratio K is not extremely high. Therefore, the value of the stop required output engstop is set to an output value engstop2 during normal operation (step 306). On the other hand, when the results of the determinations in steps 300 and 302 are both positive, there is a situation in which a deviation in the air-fuel ratio A/F needs to be avoided. Therefore, a lower-limit stop required output engstop1 is calculated according to the following method, and the calculated value is set as the stop required output engstop (step 308). This processing of step 308 is equivalent to the aforementioned stop condition correction control.

The processing of step 308 will now be described. In this processing, a recirculation amount of evaporative gas of the fuel recirculated from the oil pan 38 to the intake system is first calculated on the basis of an engine rotational speed and an intake air amount that have been detected by the sensor group. The flow rate of evaporative gas changes in accordance with an intake negative pressure, and the intake negative pressure is estimated on the basis of the engine rotational speed and the intake air amount. Therefore, the recirculation amount of evaporative gas can be calculated by storing these relationships in advance into the ECU 50. An amount of a deviation in the air-fuel ratio A/F is then calculated on the basis of the recirculation amount of evaporative gas, the oil temperature of lubricating oil, the oil dilution ratio K and the properties of fuel. The amount of the evaporative gas generated per unit time can be estimated on the basis of the oil dilution ratio K, the oil temperature of lubricating oil, and the properties of fuel. Therefore, the recirculation amount of fuel for the intake air amount, namely, the amount of the deviation in the air-fuel ratio A/F can be calculated on the basis of this generation amount and the recirculation amount of evaporative gas. Characteristic data for calculating the amount of the deviation in the air-fuel ratio A/F from the aforementioned control parameters are stored in advance in the ECU 50.

When the amount of the deviation in the air-fuel ratio A/F is confined to a predetermined permissible range, the air-fuel ratio A/F can be made to coincide with a target value through, for example, general control for correcting the amount of fuel injection. However, the amount of the deviation in the air-fuel ratio A/F tends to increase as the engine output (the intake air amount) decreases. On the other hand, the injection correction amount is limited to a value equal to or smaller than a maximum correction amount (a permissible correction amount) that is determined in accordance with, for example, the performance of the fuel injection valve 30 and the like. When the oil dilution ratio assumes a certain value, there is an operation range in which the required injection correction amount is larger than the permissible correction amount. In this operation range, it is difficult to confine the amount of the deviation in the air-fuel ratio A/F to a permissible range. Thus, in step 308, the lower limit of the engine output that allows the amount of the deviation in the air-fuel ratio A/F calculated through the aforementioned calculation to be confined to the permissible range is calculated as a lower-limit stop required output engstop1 (=the stop required output). In this case, characteristic data representing the relationship between the amount of the deviation in the air-fuel ratio A/F and the engine output is stored in advance in the ECU 50.

Then in step 310, the predetermined hysteresis value enghi is added to the stop required output engstop to calculate a start required output engstart as a start condition. Then in steps 312 to 316, a start determination is made on the basis of the start required output engstart. In the start determination, it is first determined whether or not the required driving force of the vehicle is larger than the start required output engstart (step 312). When the result of this determination is positive, it is determined whether or not the other start conditions are fulfilled (step 314), as is the case with step 210 of the first embodiment of the invention (FIG. 5). Then, when the results of the determinations in step 312 and step 314 are both positive, an operation permission flag is set "ON" (step 316). Thus, the internal combustion engine is started. When the processing of step 316 is completed or when one of the results of the determinations in step 312 and step 314 is negative, a transition is made to a stop determination that will be described below.

In the stop determination, it is determined whether or not the required driving force of the vehicle is smaller than the stop required output engstop (step 318). When the result of this determination is positive, the operation permission flag is set "OFF" (step 320). Thus, the internal combustion engine is stopped. On the other hand, when the result of the determination in step 318 is negative, the routine is terminated without performing the processing of step 320.

As described above, according to the third embodiment of the invention, the stop required output engstop can be appropriately corrected on the basis of the oil dilution ratio and the engine temperature such that the internal combustion engine operates only in the operation range in which the amount of the deviation in the air-fuel ratio A/F is confined to the permissible range. According to this correction, even when the operation range suited for engine running changes in accordance with the state of the mixture of fuel in lubricating oil, the stop required output engstop can be appropriately changed in response to this change. Accordingly, in the low-load operation range in which a deviation in the air-fuel ratio A/F is likely to occur, motor running can be carried out. Even in a hybrid vehicle, a deviation in the air-fuel ratio A/F can be restrained from being caused due to engine running. Further, when the invention is applied to a hybrid vehicle, the operation control of the internal combustion engine is unlikely to be limited by the operation state of the vehicle or the like. Therefore, engine stop control and stop condition correction control can be smoothly performed.

It should be noted that step 100 in FIG. 4, step 200 in FIG. 5, step 300 in FIG. 8, and "oil dilution ratio estimation control" described in the specification represent a concrete example of the parameter acquisition means in each of the foregoing embodiments of the invention. Further, in these drawings, steps 112, 114, 116, 208, 210, 212, 318, and 320 represent a concrete example of the engine stop means. Steps 106, 108, 110, 204, 206, 302, 304, 306, and 308 represent a concrete example of the stop condition correction means. Furthermore, steps 104, 116, 118, 204, 212, 216, and 218 represent a concrete example of the idle operation limitation means. Step 214 in FIG. 5 represents a concrete example of the stop temperature acquisition means, step 222 represents a concrete example of the stop time measurement means, and step 228 represents a concrete example of the restart temperature estimation means.

Further, the second embodiment of the invention adopts a configuration in which the oil temperature To during the restart of the internal combustion engine is estimated on the basis of the stop oil temperature Tos, the idle stop time S, and the average intake air temperature Ta to perform oil temperature estimation control during the restart of the internal combustion engine. However, the invention is not limited to this configuration, but may adopt a configuration in which oil temperature estimation control during the restart of the internal combustion engine is performed in, for example, the first or third embodiment of the invention.

Further, each of the embodiments of the invention adopts a configuration in which the oil temperature To is used as the engine temperature serving as a control parameter. However, the invention is not limited to this configuration, but may adopt a configuration in which the coolant temperature Tw of coolant is used as a control parameter instead of the oil temperature.

Furthermore, each of the embodiments of the invention adopts a configuration in which the oil dilution ratio is used as a fuel mixture parameter corresponding to the amount of the fuel that has been mixed with lubricating oil. However, the invention is not limited to this configuration, but may adopt a configuration in which a parameter other than the oil dilution ratio is used as long as this parameter changes in accordance with the amount of the mixture of fuel.

The invention claimed is:

1. A control apparatus for an internal combustion engine comprising:
a fuel injection portion that carries out fuel injection for the internal combustion engine;
a recirculation portion that recirculates to an intake system evaporative gas of injected fuel that has been mixed with lubricating oil for the internal combustion engine; and
circuitry configured to:
acquire a fuel mixture parameter corresponding to an amount of fuel that has been mixed with the lubricating oil;
acquire a coolant temperature of the internal combustion engine or an oil temperature of the lubricating oil as an engine temperature;
perform engine stop control to temporarily stop the internal combustion engine when it is determined that the engine temperature is equal to or higher than a stop permission temperature, using the engine temperature as the stop condition; and
raise the stop permission temperature more than usual when the fuel mixture parameter becomes larger than a predetermined reference value,
wherein the circuitry reduces an amount of a rise in the stop permission temperature as the fuel mixture parameter increases while remaining larger than the reference value.

2. A control apparatus for an internal combustion engine comprising:
a fuel injection portion that carries out fuel injection for the internal combustion engine;
a recirculation portion that recirculates to an intake system evaporative gas of injected fuel that has been mixed with lubricating oil for the internal combustion engine; and
circuitry configured to:
acquire a fuel mixture parameter corresponding to an amount of fuel that has been mixed with the lubricating oil;
acquire a coolant temperature of the internal combustion engine or an oil temperature of the lubricating oil as an engine temperature;
perform engine stop control to temporarily stop the internal combustion engine when it is determined that the engine temperature is equal to or higher than a stop permission temperature, using the engine temperature as the stop condition;
raise the stop permission temperature more than usual when the fuel mixture parameter becomes larger than a predetermined reference value; and
prohibit idle operation of the internal combustion engine regardless of a state of fulfillment of the stop condition when the fuel mixture parameter becomes larger than a predetermined upper limit larger than the reference value.

3. The control apparatus according to claim 1, wherein the circuitry increases the amount of a rise in the stop permission temperature as the engine temperature rises while the fuel mixture parameter remains larger than the reference value.

4. The control apparatus according to claim 1, wherein the circuitry is further configured to prohibit idle operation of the internal combustion engine regardless of a state of fulfillment of the stop condition when the fuel mixture parameter becomes larger than a predetermined upper limit larger than the reference value.

5. A control apparatus for an internal combustion engine comprising:
a fuel injection portion that carries out fuel injection for the internal combustion engine;
a recirculation portion that recirculates to an intake system evaporative gas of injected fuel that has been mixed with lubricating oil for the internal combustion engine;
circuitry configured to:
acquire a fuel mixture parameter corresponding to an amount of fuel that has been mixed with the lubricating oil;
perform engine stop control to temporarily stop the internal combustion engine when a stop condition is fulfilled; and
correct the stop condition of the engine stop control on a basis of at least the fuel mixture parameter; and
an electric motor that generates a driving force of a vehicle when the circuitry stops the internal combustion engine,
wherein the stop condition is a condition that the internal combustion engine be held stopped when a required driving force of the vehicle becomes smaller than an engine stop required reference value at which the internal combustion engine is to be stopped, and wherein the circuitry increases the engine stop required reference value to correct the stop condition.

6. The control apparatus according to claim 5, wherein the circuitry increases the engine stop required reference value as the fuel mixture parameter increases.

7. The control apparatus according to claim 5, wherein the circuitry increases the engine stop required reference value as an amount of the evaporative gas generated per unit time increases.

8. The control apparatus according to claim 1, further comprising:
an air temperature detection sensor that detects an outside air temperature,
wherein the circuitry is further configured to:
acquire an engine temperature of the internal combustion engine as a stop temperature when the internal combustion engine is stopped through the engine stop control;
measure a stop time of the internal combustion engine resulting from the engine stop control; and
estimate an engine temperature during restart of the internal combustion engine on a basis of the outside air temperature, the stop temperature, and the stop time.

9. The control apparatus according to claim 1, wherein the circuitry terminates the engine stop control to start the internal combustion engine when a start condition different from the stop condition is fulfilled.

10. The control apparatus according to claim 1, wherein the fuel injection portion is a direct injection-type fuel injection valve that injects fuel into a cylinder of the internal combustion engine.

11. A control apparatus for an internal combustion engine comprising:
a fuel injection portion that carries out fuel injection for the internal combustion engine;
a recirculation portion that recirculates to an intake system evaporative gas of injected fuel that has been mixed with lubricating oil for the internal combustion engine; and
circuitry configured to:
acquire a fuel mixture parameter corresponding to an amount of fuel that has been mixed with the lubricating oil;
acquire a coolant temperature of the internal combustion engine or an oil temperature of the lubricating oil as an engine temperature;
perform engine stop control to temporarily stop the internal combustion engine when it is determined that the engine temperature is equal to or higher than a stop permission temperature, using the engine temperature as the stop condition; and
raise the stop permission temperature more than usual when the fuel mixture parameter becomes larger than a predetermined reference value,
wherein the circuitry increases an amount of a rise in the stop permission temperature as the engine temperature rises while the fuel mixture parameter remains larger than the reference value.

12. The control apparatus according to claim 1, wherein the circuitry includes an electronic control unit.

* * * * *